United States Patent
Chang et al.

(10) Patent No.: US 8,380,068 B2
(45) Date of Patent: Feb. 19, 2013

(54) DISTINCT DISPERSION COMPENSATION FOR COHERENT CHANNELS

(75) Inventors: Do-Il Chang, Allen, TX (US); Wayne S. Pelouch, McKinney, TX (US)

(73) Assignee: Xtera Communications Inc., Allen, TX (US)

( * ) Notice: Subject to any disclaimer, the term of this patent is extended or adjusted under 35 U.S.C. 154(b) by 321 days.

(21) Appl. No.: 12/895,585

(22) Filed: Sep. 30, 2010

(65) Prior Publication Data

US 2011/0097087 A1   Apr. 28, 2011

Related U.S. Application Data

(60) Provisional application No. 61/255,448, filed on Oct. 27, 2009.

(51) Int. Cl.
*H04J 14/02* (2006.01)
*H04B 10/12* (2006.01)

(52) U.S. Cl. .......................................... 398/81; 398/147

(58) Field of Classification Search .................... 398/81, 398/147

See application file for complete search history.

(56) References Cited

U.S. PATENT DOCUMENTS

| 6,417,945 | B2 * | 7/2002 | Ishikawa et al. ................. 398/79 |
| 7,292,748 | B2 * | 11/2007 | Tsukitani et al. ................. 385/24 |
| 7,499,173 | B1 | 3/2009 | Brodsky et al. |
| 2002/0159136 | A1 | 10/2002 | Lu et al. |
| 2008/0084605 | A1 | 4/2008 | Rothenberg et al. |

FOREIGN PATENT DOCUMENTS

| EP | 1241810 A | 9/2002 |
| EP | 1261153 A | 11/2002 |

OTHER PUBLICATIONS

PCT/US2010/054113, Notification of transmittal of the ISR and the Written Opinion of the ISA, or Declaration dated Apr. 27, 2012.

* cited by examiner

*Primary Examiner* — Shi K Li
(74) *Attorney, Agent, or Firm* — Workman Nydegger (57) ABSTRACT

An optical assembly in an optical link coupling two optical terminals. The optical assembly receives and demultiplexes two groups of optical wavelength channels which are each treated separately as far as dispersion compensation and discrete amplification are concerned. The optical assembly then multiplexes the two groups back into the same fiber for further transmission. For instance, one group of optical wavelength channels may each be coherent channels, and subject to no dispersion in the optical assembly, while the other group may contain non-coherent channels, which are subject to dispersion compensation in the optical assembly.

18 Claims, 4 Drawing Sheets

DISTINCT DISPERSION COMPENSATION FOR COHERENT CHANNELS

CROSS REFERENCE TO RELATED APPLICATIONS

This patent application claims the benefit under 35 U.S.C. 119 of co-pending provisional U.S. patent application Ser. No. 61/255,448 filed Oct. 27, 2009, and entitled "Mixed Dispersion Map Optical Link".

BACKGROUND

Fiber-optic communication networks serve a key demand of the information age by providing high-speed data between network nodes. Fiber-optic communication networks include an aggregation of interconnected fiber-optic links. Simply stated, a fiber-optic link involves an optical signal source that emits information in the form of light into an optical fiber. Due to principles of internal reflection, the optical signal propagates through the optical fiber until it is eventually received into an optical signal receiver. If the fiber-optic link is bi-directional, information may be optically communicated in reverse typically using a separate optical fiber.

Fiber-optic links are used in a wide variety of applications, each requiring different lengths of fiber-optic links. For instance, relatively short fiber-optic links may be used to communicate information between a computer and its proximate peripherals, or between a local video source (such as a DVD or DVR) and a television. On the opposite extreme, however, fiber-optic links may extend hundreds or even thousands of kilometers when the information is to be communicated between two network nodes.

Long-haul and ultra-long-haul optics refers to the transmission of light signals over long fiber-optic links on the order of hundreds or thousands of kilometers. Typically, long-haul optics involves the transmission of optical signals on separate channels over a single optical fiber, each channel corresponding to a distinct wavelength of light using principles of Wavelength Division Multiplexing (WDM) or Dense WDM (DWDM).

Transmission of optic signals over such long distances using WDM or DWDM presents enormous technical challenges, especially at high bit rates in the gigabits per second per channel range. Significant time and resources may be required for any improvement in the art of high speed long-haul and ultra-long-haul optical communication. Each improvement can represent a significant advance since such improvements often lead to the more widespread availability of communications throughout the globe. Thus, such advances may potentially accelerate humankind's ability to collaborate, learn, do business, and the like, with geographical location becoming less and less relevant.

BRIEF SUMMARY

Embodiments described herein relate to an optical assembly in an optical link coupling two optical terminals. The optical assembly receives and de-multiplexes two groups of optical wavelength channels which are each treated separately as far as dispersion compensation and discrete amplification are concerned. The optical assembly then multiplexes the two groups back into the same fiber for further transmission. For instance, one group of optical wavelength channels may each be coherent channels, and subject to no dispersion compensation, while the other group may contain non-coherent channels, which are subject to dispersion compensation in the optical assembly. Instances of the optical assembly may be distributed between an optical transmission terminal and an optical reception terminal, to thereby impart different dispersion maps to the non-coherent channels as compared to the coherent channels. This allows the dispersion maps to be more tailored towards improving performance for the particular coherent or non-coherent channels.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, an optical node in an optical link couples two optical terminals. Any of the optical nodes may comprise an optical assembly that receives and demultiplexes two groups of optical wavelength channels which are each treated separately as far as dispersion compensation and discrete amplification are concerned. The optical assembly then multiplexes the two groups back into the same fiber for further transmission. For instance, one group of optical wavelength channels may each be coherent channels, and subject to no dispersion compensation, while the other group may contain non-coherent channels, which are subject to dispersion compensation in the optical assembly.

The term "coherent" refers to the ability to measure the electric field of the transmitted channel during detection (both amplitude and phase). This information may be fed into a powerful digital processor which can compensate for optical dispersion in the electronic domain. This electronic dispersion compensation allows, but does not require, under-compensation (or no compensation) or over-compensation of optical dispersion over the optical link.

There are several advantages to applying different dispersion to coherent channels. One advantage relates to the quality of the optical transmission of the coherent channel in that in some cases the quality of the coherent channel is highest when optical dispersion compensation is minimized. However, non-coherent channels require optical dispersion compensation (to within the dispersion tolerance of the receiver). Thus, when combining coherent and non-coherent channels in the same optical fiber, there are cases where having different optical dispersion compensation for each type of channel is preferred.

In another case, the quality of the coherent channels may improve by applying additional optical dispersion; one example of this may be an optical link wherein the optical fiber connecting two optical terminals has very low or zero dispersion at a wavelength near that of one or more transmitted coherent channels.

Figure 1:
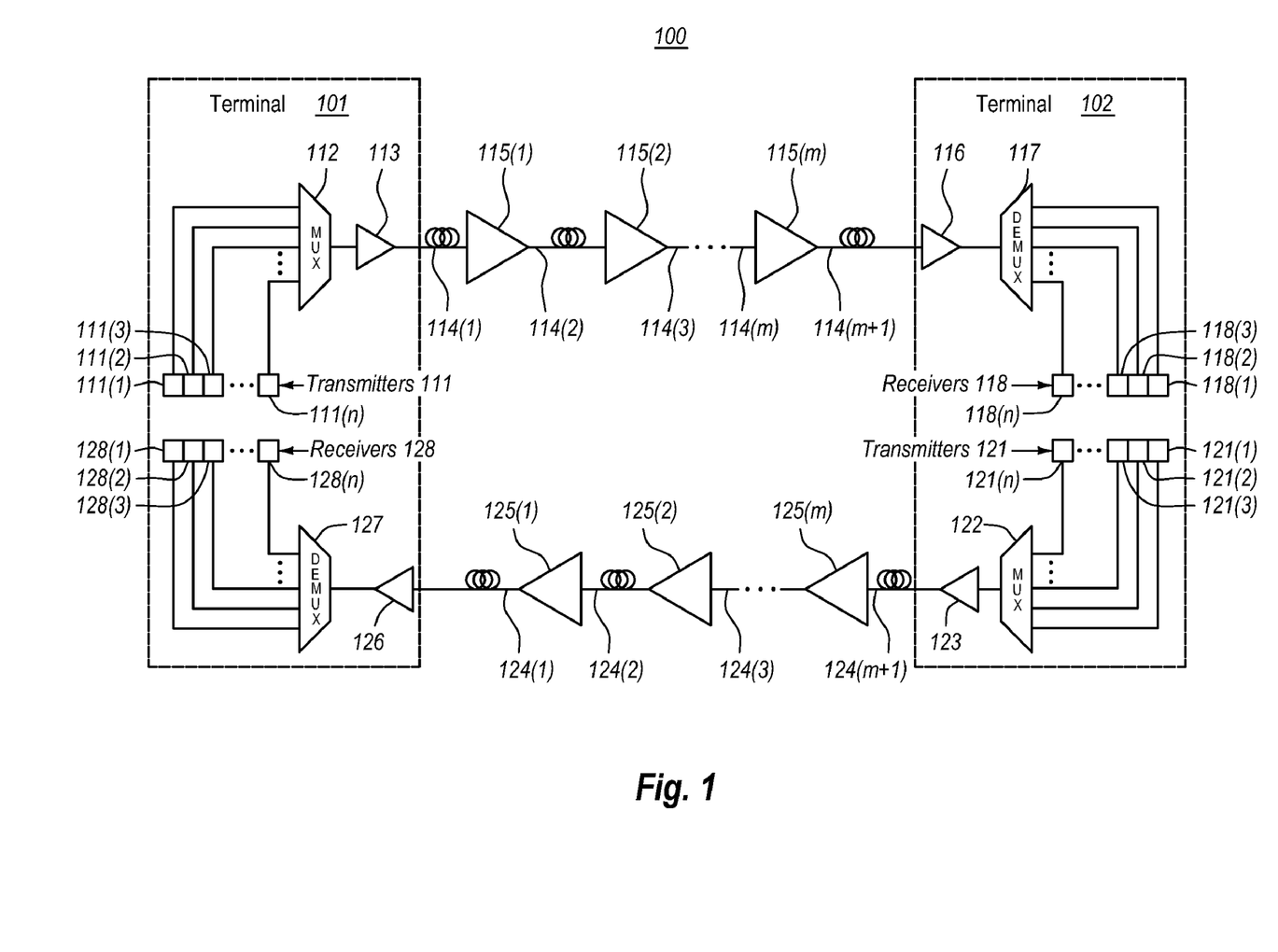
FIG. 1 illustrates an optical communication system in which the principles described herein may be employed.

FIG. 1 schematically illustrates an example optical communications system 100 in which the principles described herein may be employed. In the optical communications system 100, information is communicated between terminals 101 and 102 via the use of optical signals. For purposes of convention used within this application, optical signals travelling from the terminal 101 to terminal 102 will be referred to as being "eastern", whereas optical signals traveling from the terminal 102 to the terminal 101 will be referred to as being "western". The terms "eastern" and "western" are simply terms of art used to allow for easy distinction between the two optical signals traveling in opposite directions. The use of the terms "eastern" and "western" does not imply any actual geographical relation of components in FIG. 1, nor to any actual physical direction of optical signals. For instance, terminal 101 may be geographical located eastward of the terminal 102, even though the convention used herein has "eastern" optical signals traveling from the terminal 101 to the terminal 102.

In one embodiment, the optical signals are Wavelength Division Multiplexed (WDM) and potentially Dense Wavelength Division Multiplexed (DWDM). In WDM or DWDM, information is communicated over each of multiple distinct optical channels called hereinafter "optical wavelength channels". Each optical wavelength channel is allocated a particular frequency for optical communication. Accordingly, in order to communicate using WDM or DWDM optical signals, the terminal 101 may have "n" optical transmitters 111 (including optical transmitters 111(1) through 111(n), where n is a positive integer), each optical transmitter for transmitting over a corresponding eastern optical wavelength channel. Likewise, the terminal 102 may have "n" optical transmitters 121 including optical transmitters 121(1) through 121(n), each also for transmitting over a corresponding western optical wavelength channel. The principles described herein are not limited, however, to communications in which the number of eastern optical wavelength channels is the same as the number of western optical wavelength channels. Furthermore, the principles described herein are not limited to the precise structure of the each of the optical transmitters. However, lasers are an appropriate optical transmitter for transmitting at a particular frequency. That said, the optical transmitters may each even be multiple laser transmitters, and may be tunable within a frequency range.

As for the eastern channel for optical transmission in the eastern direction, the terminal 101 multiplexes each of the eastern optical wavelength signals from the optical transmitters 111 into a single eastern optical signal using optical multiplexer 112, which may then be optically amplified by an optional eastern optical amplifier 113 prior to being transmitted onto a first fiber link 114(1). In this description, the terms "fiber link" and "fiber span" are used interchangeably.

There are a total of "m" repeaters 115 and "m+1" optical fiber links 114 between the terminals 101 and 102 in the eastern channel. In an unrepeatered optical communication system, "m" would be zero such that there is but a single fiber link 114(1) and no repeaters between the terminals 101 and 102. In a repeatered optical communication system, "m" would be one or greater. Each of the repeaters, if present, may consume electrical power to thereby amplify the optical signals.

The eastern optical signal from the final optical fiber link 114(m+1) is then optionally amplified at the terminal 102 by the optional optical amplifier 116. The eastern optical signal is then demultiplexed into the various wavelength optical wavelength channels using optical demultiplexer 117. The various optical wavelength channels may then be received and processed by corresponding optical receivers 118 including receivers 118(1) through 118(n).

As for the western channel for optical transmission in the western direction, the terminal 102 multiplexes each of the western optical wavelength signals from the optical transmitters 121 (including optical transmitters 121(1) through 121(n)) into a single western optical signal using the optical multiplexer 122. The multiplexed optical signal may then be optically amplified by an optional western optical amplifier 123 prior to being transmitted onto a first fiber link 124(m+1). There are once again "m" repeaters 125 (labeled 125(1) through 125(m)), and "m+1" optical fiber links 124 (labeled 124(1) through 124(m+1)). Recall that in an unrepeatered environment, "m" may be zero such that there is only one optical fiber link 124(1) and no repeaters 125 in the western channel.

The western optical signal from the final optical fiber link 124(1) is then optionally amplified at the terminal 101 by the optional optical amplifier 126. The western optical signal is then demultiplexed using optical demultiplexer 127, whereupon the individual wavelength division optical channels are received and processed by the receivers 128 (including receivers 128(1) through 128(n)). Terminals 101 and/or 102 do not require all the elements shown in optical communication system 100. For example, optical amplifiers 113, 116, 123, and/or 126 might not be used in some configurations. Furthermore, if present, each of the corresponding optical amplifiers 113, 116, 123 and/or 126 may be a combination of multiple optical amplifiers if desired.

Often, the optical path length between repeaters is approximately the same. The distance between repeaters will depend on the total terminal-to-terminal optical path distance, the data rate, the quality of the optical fiber, the loss-characteristics of the fiber, the number of repeaters (if any), the amount of electrical power deliverable to each repeater (if there are repeaters), and so forth. However, a typical optical path length between repeaters (or from terminal to terminal in an unrepeatered system) for high-quality single mode fiber might be about 50 kilometers, and in practice may range from 30 kilometers or less to 90 kilometers or more. That said, the principles described herein are not limited to any particular optical path distances between repeaters, nor are they limited to repeater systems in which the optical path distances are the same from one repeatered segment to the next.

The optical communications system 100 is represented in simplified form for purpose of illustration and example only. The principles described herein may extend to much more complex optical communications systems. The principles described herein may apply to optical communications in which there are multiple fiber pairs, each for communicating multiplexed WDM optical signals. Furthermore, the principles described herein also apply to optical communications in which there are one or more branching nodes that split one or more fiber pairs and/or optical wavelength channels in one direction, and one or more fiber pairs and/or optical wavelength channels in another direction. In addition, the principles described herein apply to asymmetric bi-directional optical channels in which there are a different number of repeaters in the eastern direction as compared to the western direction.

Figure 2A:
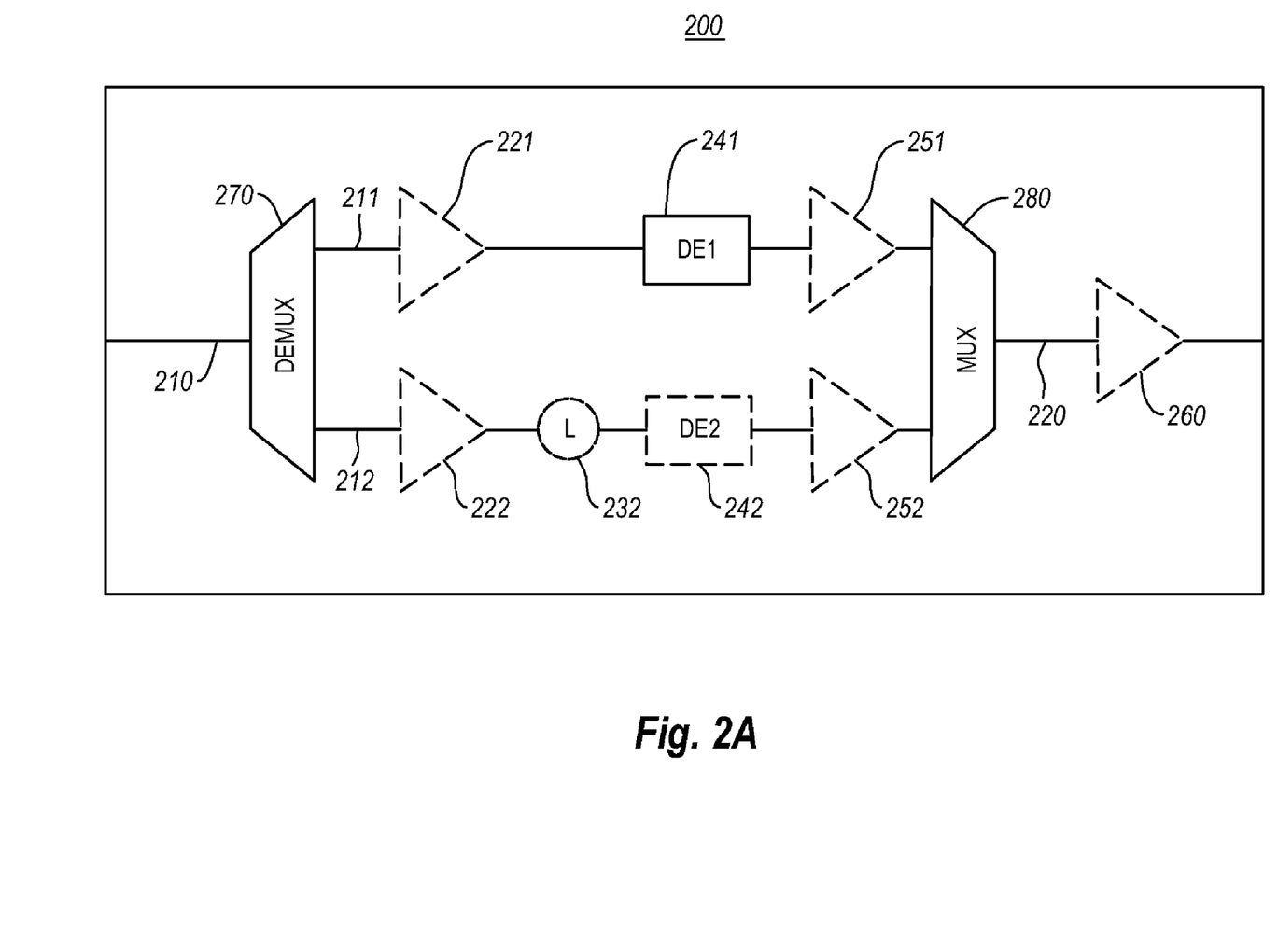
FIG. 2A schematically illustrates an optical assembly that may operate in the optical communication system of FIG. 1, and in which coherent optical channels are separated from non-coherent optical channels.

FIG. 2A illustrates an optical assembly 200 that may be used in-line in the optical communication system 100 of FIG. 1. For instance, suppose the optical assembly 200 is included in-line in the eastern direction of the optical communication system 100. In that case, if there are eastern repeaters, the optical assembly 200 may be included within those repeaters. Alternatively, the optical assembly 200 may be included within any node such as perhaps an optical add drop multiplexer.

The optical assembly 200 includes a receive port 210 for receiving optical signals from a prior optical fiber link or prior optical component within an optical node. The received optical signal is a mixed coherent and non-coherent optical signal in that it includes both coherent optical channels and non-coherent optical wavelength channels. Coherent optical wavelength channels are the optical wavelength channels that will be coherently detected. Non-coherent optical wavelength channels are the optical wavelength channels that will be directly (or non-coherently) detected without measuring the electric field of the optical signal.

An optical demultiplexer 270 receives the optical wavelength channels and is configured to de-multiplex the signals into at least two paths, 211 and 212; one path contains the coherent optical channels and the other path contains non-coherent optical channels. In one embodiment, the coherent channels are provided onto path 211 and the non-coherent channels are provided onto path 212. In another embodiment, the coherent channels are provided onto path 212 and the non-coherent channels are provided onto path 211.

Path 211 comprises a dispersive element (DE) 241 and optionally comprises optical amplification element 221 and optionally comprises optical amplification element 251. Amplification elements 221 and 251 may be separate modules or may be different amplification stages of one amplifier module. Optical amplification elements 221 and 251 provide for higher optical power at the output port relative to the input port and at least partially compensate for the optical power loss of DE 241.

In FIG. 2A, the dispersive element (DE) 241 is located between two optional amplifiers 221, 251, however, the location of DE 241 can be anywhere in path 211.

In another embodiment, dispersive element 241 may be part of one of more of the amplification elements 221 and 251. One example of this is a discrete Raman amplification module wherein the amplifier gain fiber spool is dispersive. In this embodiment, one amplifier module may comprise DE 241 and amplification element 221 or 251 (or both). In another embodiment, two or more modules along optical path 211 may contain dispersive elements wherein the net sum of dispersion is illustrated in FIG. 2A as dispersive element 241. For example, an amplification module might comprise amplification elements 221 and 251 and have internal dispersion in addition to a separate dispersion compensation module.

It is understood from the above descriptions of the elements in FIG. 2A, that the elements represent functions or methods and do not necessarily correspond to individual modules, although in some embodiments the elements of FIG. 2A may correspond to individual modules.

Path 212 optionally comprises a dispersive element (DE) 242 and optionally comprises optical amplification element 222 and optionally comprises optical amplification element 252 and optionally comprises a loss element 232. DE 242 and amplifications elements 222 and 252 provide for the same functionality of as the corresponding elements described for path 211. However, the dispersion of DE 242 (if used) will be different than the dispersion of DE 241. In this manner, the total dispersion of paths 211 and 212 will be significantly different.

In one embodiment, loss element 232 has a similar loss value for signal wavelengths on path 212 as the loss of DE 241 for signal wavelengths on path 211. In another embodiment, loss element 232 has a similar loss value for signal wavelengths on path 212 as the loss of DE 241 for signal wavelengths on path 211 and amplification elements 221, 251, 222, 252, and DE 242 are not used. Loss element 232 may be a separate component or may be contained within any combination of or all of amplification elements 222 and 252 and DE 242. Loss element 232 may be a fixed value of attenuation or may be a variable value of attenuation for signal wavelengths on path 212. Loss element 232 may be a passive attenuator or may be an active (electronically controlled) attenuator.

In FIG. 2A, the dispersive element (DE) 242 and loss element (L) 232 are located between two optional amplifiers 222 and 252; however, the location of DE 242 and L 232 can be anywhere in path 212.

In one embodiment, the optional elements 221, 251, 222, 232, and 252 provide a method of approximately equalizing the total path loss or gain of paths 211 and 212.

An optical multiplexer 280 receives and combines the signal wavelengths on paths 211 and 212 into a single path 220. Path 220 thus contains both the coherent and non-coherent optical channels. Optionally, an amplification element 260 amplifies the mixed optical signal to thereby provide discrete amplification to both the coherent and non-coherent optical wavelength signals.

Amplification element 260 is shown in optical assembly 200 after multiplexer 280, but in another embodiment amplification element 260 is located before de-multiplexer 270 and provides for a similar functionality.

In one embodiment, the optional elements 221, 251, 222, 232, 252, and 260 provide a method of approximately equalizing the total path loss or gain of the coherent and non-coherent optical wavelength signals from input port 210 to output port 220 (after optional amplification element 260).

Optical assembly 200 in FIG. 2A provides different dispersion to the coherent and non-coherent channels which may improve the performance for all channels. Dispersion element 241 and 242 may comprise dispersion compensating fiber which typically increases detrimental nonlinear optical effects and thus reduces the quality of the channels. The nonlinear effects in dispersion compensating fiber may increase if both coherent and non-coherent channels are mixed. Therefore, providing separate paths for coherent and non-coherent channels will reduce the nonlinear interactions between these channels and improve the quality of the optical signals.

Figure 2B:
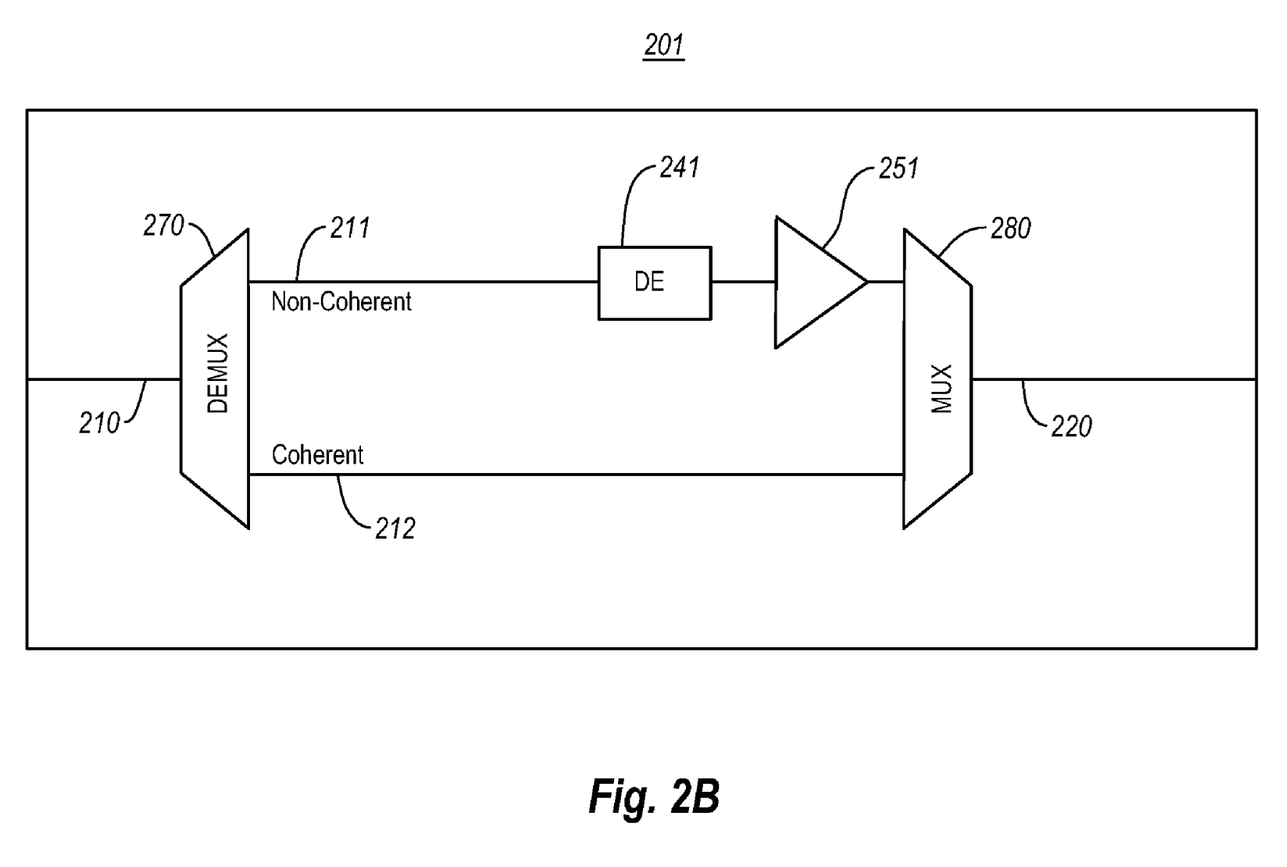
FIG. 2B illustrates a more specific example of the optical assembly of FIG. 2A.

FIG. 2B illustrates an optical assembly 201 that is one embodiment of optical assembly 200. It is understood that the elements of optical assembly 201 have similar functions as the corresponding elements of optical assembly 200. In optical assembly 201, the coherent optical channels are provided onto optical path 212 (also called herein a "coherent optical path" since it carries coherent optical wavelength channels), while the non-coherent optical channels are provided onto optical path 211 (also called herein a "non-coherent optical path" since it carries non-coherent optical wavelength channels).

The non-coherent optical wavelength channels passes to a dispersive element (DE) 241 that introduces a different dispersion into the non-coherent optical channels as compared to the dispersion, if any, that is introduced into the coherent optical wavelength channels. In the illustrated case, for example, the coherent optical wavelength channels bypass the DE 241 completely such that DE 241 does not provide any dispersion for the coherent optical wavelength channels.

As the non-coherent optical wavelength channels pass through DE 241, there will be some loss in signal power. Accordingly, an amplification element 251 is provided to at least partially restore the optical signal power lost in the DE 241. The amount of attenuation that occurs in the non-coherent optical wavelength channels in DE 241 is much greater than the attenuation experienced by the coherent optical wavelength channels, which are permitted to bypass DE 241. The amplification element 251 thus helps the optical power of the non-coherent optical wavelength channels be more in line with the optical power of the coherent optical wavelength channels once the two signals are again combined using multiplexer 280. In the illustrated embodiment, the amplification element 251 does not provide any amplification for the coherent optical wavelength channels. Furthermore, in one embodiment, the amplification element provides back at least 50 percent, but less than 150 percent of the optical power lost by the non-coherent optical wavelength channels that pass through DE 241.

The amplification element 251 may comprise, for example, a second dispersive element that is optically pumped to provide amplification. The use of a pumped dispersion element, rather than for example a rare-Earth doped fiber amplifier, permits for wide-band amplification, which optionally in combination with forward and/or backward Raman amplification in the line, allows the channel to support wide bandwidths of optical channels. However, the amplifier 251 may also be a rare-Earth doped fiber amplifier or a hybrid amplifier which uses both rare-Earth doped fiber amplification and fiber Raman amplification. In one embodiment, the amplifier 251 includes dispersion element 241. In another embodiment, amplification element 251 may be any optical amplifier with or without significant internal dispersion that provides amplification to the non-coherent optical channels.

An optical multiplexer 280 receives and combines the coherent and non-coherent optical wavelength signals to generate a mixed coherent and non-coherent optical signal on port 220. Since the optical assembly 201 applies dispersion to the non-coherent optical wavelength channels, and is included in-line, the optical assembly 201 may thus help to create different dispersion maps for the coherent and non-coherent optical wavelength channels. Thus, the optical assembly 201 may be used in a system in which different dispersion maps are to be applied to coherent channels as compared to non-coherent channels.

Coherent detection and non-coherent detection are very different in their sensitivity to dispersion maps. For non-coherent detection (also called "direct detection"), current systems compensate for dispersion frequently so as to keep the absolute value of the accumulated dispersion relatively low. On the other hand, for coherent detection, the absolute value of accumulated dispersion may be allowed to be quite high, perhaps even as high as 50,000 picoseconds (ps) per nanometer (nm) (i.e., ps/nm). Furthermore, if dispersion is to approach too close to zero, non-linear distortion may reduce the signal quality or effectiveness of coherent detection. Thus, different dispersion maps may be formulated for optical wavelength channels that are to be subjected to coherent detection as opposed to direct detection.

Optical assembly 201 in FIG. 2B provides different dispersion to the coherent and non-coherent channels which may improve the performance for all channels. Dispersion element 241 may comprise dispersion compensating fiber which typically increases detrimental nonlinear optical effects which reduce the quality of the channels. Therefore, optical assembly 201 may also improve the performance of the coherent channels by bypassing the potential nonlinear interaction in DE 2451.

Accordingly, the principles described herein provide an optical assembly in which different optical wavelength channels may be treated differently as far as dispersion compensation is concerned, thereby allowing hybrid optical wavelength channels to be used in a signal system.

Figure 3:
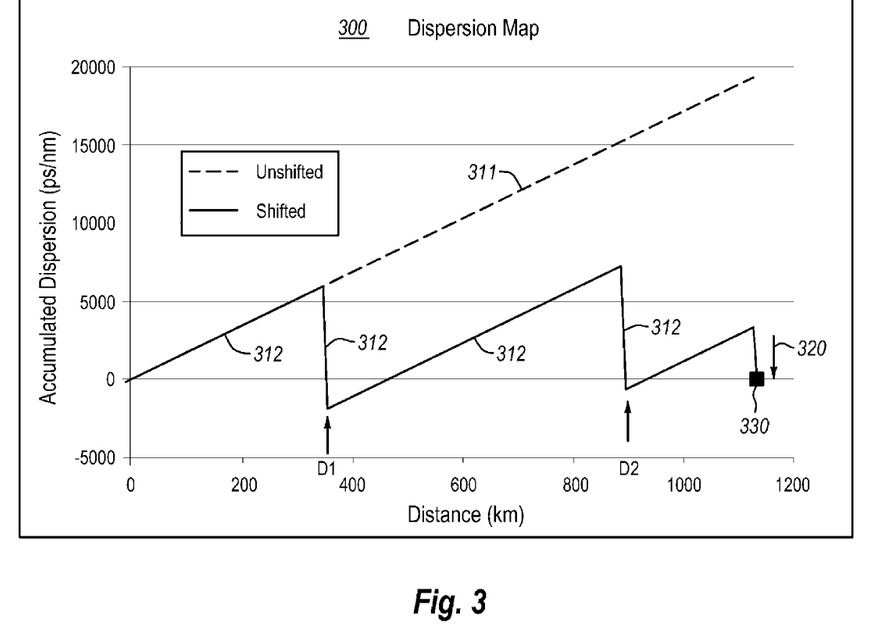
FIG. 3 illustrates a dispersion map showing how the optical assembly of FIG. 2 may operate upon a dispersion map of coherent channels in an non-dispersion compensated system, in which non-coherent channels are separated periodically using the optical assembly of FIG. 2A or 2B in order to perform dispersion compensation on the non-coherent optical channels.

FIG. 3 illustrates an example of a mixed dispersion map 300 that could be enabled by having two of the optical assemblies 200 of FIG. 2A in-line at distance D1 and distance D2. In this case, the optical assembly 200 is not included at every node or repeater, but in another embodiment the optical assembly 200 could be included for each optical fiber span. The mixed dispersion map includes a dispersion map 311 for coherent optical channels (hereinafter, also referred to as a "coherent dispersion map" and represented by the dashed line), and a dispersion map 312 for non-coherent channels (hereinafter, also referred to as a "non-coherent dispersion map" and represented by the solid line).

In this mixed dispersion map 300, there is no pre-compensation (which is to say dispersion applied at the transmit terminal), although there could certainly be pre-compensation applied, and the pre-compensation may be different for either or both of the coherent dispersion map 311 and non-coherent dispersion map 312. In FIG. 3, an instance of the optical assembly 200 of FIG. 2A appears at points D1 and D2. In the illustrated case, the coherent optical wavelength channels are briefly separated from the non-coherent channels during dispersion compensation. The coherent optical wavelength channels thus bypass the dispersion compensation, and thus the accumulated dispersion of the coherent optical wavelength channels accumulates. There could be some dispersion compensation imparted to the coherent optical wavelength channels (for instance if accumulated dispersion approaches the limit which can be compensated in the electronic domain, e.g. 50,000 ps/nm). However, FIG. 3 shows no dispersion compensation for the coherent optical wavelength channels. Accordingly, the optical system may have been originally a non-dispersion compensated system.

However, for non-coherent optical wavelength channels, dispersion compensation is applied at points D1 and D2. At these locations, the non-coherent optical wavelength channels are separated from the coherent optical wavelength channels, and the non-coherent optical wavelength channels are dispersion compensated. The amount of dispersion applied to the non-coherent channels at D1 and D2 may be less than, equal to, or greater than the accumulated dispersion of the link. In the illustrated example, there is some final dispersion compensation applied (as represented by arrow 320), which returns the total accumulated dispersion of the non-coherent optical wavelength channels 330 to close to zero. This is important so that the non-coherent optical wavelength channels can be direct detected. The non-coherent dispersion map 312 therefore takes a more irregular sawtooth-shaped pattern.

Thus, even in a fundamentally non-dispersion compensated system, instances of the optical assembly 200 may be periodically placed in-line to allow the accumulated dispersion of the non-coherent channels to remain closer to zero, while allowing the dispersion of the coherent channels to continue to accumulate, or at least be much higher.

In the illustrated embodiment of FIG. 3, an optical assembly 200 is not placed for every optical fiber span. For instance, there is an optical distance of about 360 kilometers from distance 0 (at the transmission terminal) to distance D1, an optical distance of about 530 kilometers from distance D1 to D2, and an optical distance of about 250 kilometers from distance D2 to the receiving terminal. These distances are greater than the average distance between repeaters. However, the principles described herein may also apply where an optical assembly 200 is placed in every optical fiber span.

If optical assembly 200 or 201 is used in optical communication system 100 of FIG. 1, then any of the optical repeaters 115, 125 may comprise optical assembly 200 or 201. Any of the transmitters 111/receivers 128 and transmitters 121/receivers 118 of optical communication system 100 may be either coherent or non-coherent optical channels. However, depending on the type of de-multiplexer/multiplexer of optical assembly 200, there may be constraints on which optical channels are coherent or non-coherent. For example, the wavelengths of the optical channels may be constrained.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical assembly comprising:
   an input optical port for receiving a mixed optical signal containing a combination of coherent optical wavelength channels and non-coherent optical wavelength channels;
   an optical demultiplexer configured to separate the combination of optical wavelength channels present on the input optical port such that a plurality of coherent optical wavelength channels and no non-coherent optical wavelength channels are provided onto a coherent optical path, and such that a plurality of non-coherent optical wavelength channels and no coherent optical wavelength channels are provided onto a non-coherent optical path;
   a dispersive element disposed in one or both of the coherent and non-coherent optical paths and that operates such that a different amount of dispersion is applied to the plurality of non-coherent optical wavelength channels traveling through the non-coherent optical path than the amount of dispersion, if any, that is applied to the coherent optical path; and
   an optical multiplexer configured to receive and combine the optical wavelength channels from the coherent and non-coherent optical paths to form a mixed coherent and non-coherent optical output signal on an output of the optical multiplexer.

2. The optical assembly in accordance with claim 1, further comprising one or more optical elements that are configured to approximately equalize the optical gain or loss of a first path and a second path from the input optical port to the output of the optical multiplexer, the first path leading from the input optical port through the optical demultiplexer through the non-coherent optical path through the optical multiplexer and to the output of the optical multiplexer, the second path leading from the input optical port through the optical demultiplexer through the coherent optical path through the optical multiplexer and to the output of the optical multiplexer.

3. The optical assembly in accordance with claim 2 where at least one of the one or more optical elements is an optical attenuator.

4. The optical assembly in accordance with claim 2 where at least one of the one or more optical elements is an optical amplifier.

5. The optical assembly in accordance with claim 4, wherein the optical amplifier comprises at least one of a rare-Earth doped optical amplifier or a discrete Raman amplifier or a hybrid optical amplifier which comprises both rare-Earth doped fiber amplification and fiber Raman amplification.

6. The optical assembly in accordance with claim 1, further comprising:
   an optical amplifier configured to amplify the mixed coherent and non-coherent optical signal.

7. The optical assembly in accordance with claim 1, wherein the dispersive element is included in the non-coherent optical path.

8. The optical assembly in accordance with claim 7, wherein the coherent optical path does not include dispersive elements.

9. The optical node in accordance with claim 8, wherein the coherent optical path does not include an amplifier.

10. The optical assembly in accordance with claim 7, wherein the non-coherent optical path includes an optical amplifier with sufficient gain to compensate for from 50 percent to 150 percent of the loss contributed by a remainder of the optical elements within the non-coherent optical path.

11. The optical assembly in accordance with claim 1, wherein the dispersive element is included in the coherent optical path.

12. An optical system comprising:
    a transmission terminal;
    a receiver terminal;
    a plurality of optical repeaters;
    a plurality of optical assemblies used to separate coherent optical channels from non-coherent optical channels, and apply different dispersion to the non-coherent optical channels as compared to dispersion, if any, that is applied to the coherent optical channels before recombining the coherent and non-coherent optical channels for further transmission towards the receiver terminal.

13. The optical system in accordance with claim 12, wherein at least one of the plurality of optical assemblies comprises:
    an optical demultiplexer configured to receive a mixed coherent and non-coherent optical signal at its input, and output a plurality of coherent optical wavelength channels onto a coherent optical path, and a plurality of non-coherent optical wavelength channels onto a non-coherent optical path;
    a dispersive element disposed in one or both of the coherent and non-coherent optical paths and that operates such that a different dispersion is applied to the non-coherent optical path as compared to the dispersion, if any, applied to the coherent optical path; and
    an optical multiplexer configured to receive and combine the plurality of coherent optical wavelength channels from the coherent optical path, and the plurality of non-coherent optical wavelength channels from the non-coherent optical path to form a mixed coherent and non-coherent optical output signal.

14. The optical system in accordance with claim 12, wherein some of the plurality of optical repeaters do not have one of the plurality of optical assemblies.

15. The optical system in accordance with claim 12, wherein each of the plurality of optical repeaters has at least one of the plurality of optical assemblies.

16. A method for applying different dispersion to coherent and non-coherent optical channels, the method comprising:
an act of receiving a mixed optical signal containing a combination of coherent optical wavelength channels and non-coherent optical wavelength channels;
an act of demultiplexing the plurality of coherent optical wavelength channels onto a coherent optical path, and the plurality of non-coherent optical wavelength channels onto a non-coherent optical path;
an act of applying dispersion onto one or both of the coherent optical path and the non-coherent optical path such that different dispersion is applied to the plurality of non-coherent optical wavelength channels on the non-coherent optical path as compared to the dispersion, if any, that is applied to the coherent optical path; and
an act of multiplexing the plurality of coherent optical wavelength channels and the plurality of non-coherent optical wavelength channels to formulate a mixed coherent and non-coherent optical output signal.

17. The method in accordance with claim 16, wherein the act of applying dispersion operates such that different dispersion is applied on the non-coherent optical path, but no dispersion is applied to the coherent optical path.

18. The method in accordance with claim 17, further comprising:
an act of approximately equalizing the optical gain or loss of a first path and a second path from an input of a demultiplexer that performs the act of demultiplexing to an output of a multiplexer that performs an act of multiplexing, the first path leading from the input of the demultiplexer through the optical demultiplexer through the non-coherent optical path through the optical multiplexer and to the output of the optical multiplexer, the second path leading from the input of the demultiplexer through the optical demultiplexer through the coherent optical path through the optical multiplexer and to the output of the optical multiplexer.

* * * * *